Patented June 10, 1930

1,762,482

UNITED STATES PATENT OFFICE

WILBER B. MILLER, OF FLUSHING, NEW YORK, ASSIGNOR TO ELECTRO METALLURGICAL COMPANY, A CORPORATION OF WEST VIRGINIA

WELDING ROD

No Drawing. Application filed May 3, 1927. Serial No. 188,610.

The invention relates to welding rods for use in processes involving the use of the electric arc or the oxyacetylene blow torch for fusing the metal being deposited in the weld. The invention relates particularly to the composition of the welding rod used in such operations.

In fabricating by welding articles designed to exhibit high strength, certain limitations are imposed as to the materials which can be used because many steels and alloys which inherently possess high strength cannot be welded successfully, and other steels and alloys although more or less readily weldable require heat treatment involving quenching or similar operations which, except in the case of small easily manipulable articles, are impracticable of application after the fabrication of the article is completed. Certain steels and alloys which are capable of being air-hardened are suitable for this purpose and among these are steels having a manganese content of 0.8–2.0%, with carbon not higher than 0.5%.

Since a pressure vessel or other article designed to withstand high pressures or tensile stresses is only as strong as its weakest portion, it is important to produce welds in such articles which are uniformly strong and of at least as high strength as the rest of the article. The invention has for an object the production of such welds.

I have found that when molybdenum is added to high manganese steels their welding properties show marked improvement. The metal behaves well under the torch and the strength of the welds obtained is from 10–20% greater than that of similar compositions without molybdenum. The tendency to show temper brittleness is also reduced.

The compositions comprised within the invention are ferrous alloys containing manganese, silicon, molybdenum and carbon. The presence of other chemical elements which do not adversely affect the alloys for the use under discussion is, of course, not precluded. The compositions of the invention contain manganese in excess of about 1.5% and may contain as high as 4.0%, although the preferred manganese range is from 1.75% to 2.50%. The silicon content is preferably less than 0.4% and above 0.10%. It may, however, be higher. Compositions containing molybdenum in amounts of from 0.2% to 0.6% show the best properties although a higher percentage is not precluded. Carbon is preferably present in amounts of from 0.05% to 0.5%. Carbon enhances the strengthening influences of molybdenum in the weld, probably due to the fact that carbides of molybdenum are formed. Accordingly, where ductility may be sacrificed in order to obtain high strength still larger amounts of carbon may be present.

Welds showing an ultimate strength without subsequent heat treatment of upwards of 85,000 lbs. per sq. in. with an elongation of from 2.5% to 10% in two inches may be obtained consistently by the use of welding rod compositions within the range above indicated. Welds exhibiting a strength of upwards of 100,000 lbs. per sq. and possessing considerable ductility have been obtained.

The following specific examples will indicate the results which may be expected by the use of the welding rod compositions of the present invention.

Test No. 1

A series of welds were made with ¼" high strength plate material analyzing 1.4% manganese, 0.29% silicon, and 0.34% carbon. Plates of this material were joined by double V welds by the use of an oxy-acetylene blow torch and with a welding rod composition analyzing 1.77% manganese, 0.53% molybdenum, 0.38% silicon and 0.22% carbon. The welds thus obtained when tested to destruction showed the following results:

| Test piece No. | Yield point lbs./sq. in. | Ultimate strength lbs./sq. in. | Per cent elongation in 2" over weld |
|---|---|---|---|
| 1 | 59,600 | 96,500 | 5.0 |
| 2 | 65,200 | 99,200 | 2.5 |
| 3 | 63,500 | 100,000 | 2.5 |

Since test pieces Nos. 2 and 3 broke in the plate outside the weld the percentage given for elongation does not represent the full ductility of the weld.

Test No. 2

Using ½" plate material analyzing 0.86% manganese, 0.45% carbon and 0.14% silicon and a welding rod containing 1.87% manganese, 0.64% molybdenum, 0.31% silicon and 0.32% carbon, welds showing the following results were obtained:

| Test piece No. | Yield point lbs./sq. in. | Ultimate strength lbs./sq. in. | Per cent elongation in 2" over weld |
|---|---|---|---|
| 1 | 50,200 | 94,800 | 3.0 |
| 2 | 48,600 | 95,100 | 4.0 |

Test piece No. 2 was torch annealed at a full red heat for about 3 minutes. It will be noted that this short annealing improved the ductility without any appreciable effect on the ultimate strength.

Test No. 3

Still another series of welds was made with high manganese steel plate $\frac{5}{16}$" thick and analyzing 2.20% manganese, 0.015% silicon and 0.34% carbon. The welding rod used contained 1.82% manganese, 0.58% molybdenum, 0.33% silicon and 0.27% carbon. Both single V and double V welds were made with the aid of an oxy-acetylene torch. This series of welds was subjected to heat treatment as indicated:

| Test piece No. | Yield point lbs./sq.in. | Ultimate strength lbs./sq. in. | Per cent elongation in 2" over weld | Heat Treatment |
|---|---|---|---|---|
| Single V welds: | | | | |
| 1 | 65,300 | 86,500 | 8.0 | Double Anneal |
| 2 | 65,700 | 92,200 | 12.0 | Do |
| 3 | 66,150 | 84,600 | 10.5 | Do |
| 4 | 67,000 | 89,900 | 2.0 | Single Anneal |
| 5 | 68,700 | 90,800 | 6.0 | Do |
| Double V welds: | | | | |
| 6 | 72,150 | 105,600 | 5.0 | Double Anneal |
| 7 | 67,800 | 87,000 | 5.0 | Do |
| 8 | 71,000 | 94,500 | 3.5 | Single Anneal |
| 9 | 71,400 | 103,000 | 4.0 | Do |

The heat treatment referred to consisted of annealing 920° C. for one hour followed by air cooling in the case of those welds which were given a single anneal, while in the case of those given a double anneal the heat treatment above mentioned was followed by a second annealing treatment for one hour at 650° C., followed by air cooling. All of these welds except No. 6 were ground before testing.

I claim:

1. A welding rod consisting of an iron alloy containing manganese 1.5% to 4.0%, molybdenum 0.20% to 0.60%, silicon 0.10% to 0.40%, and carbon 0.05% to 0.50%.

2. A welding rod consisting of an iron alloy containing manganese 1.75% to 2.50%, molybdenum 0.20% to 0.60%, silicon 0.10% to 0.40%, and carbon 0.05% to 0.50%.

In testimony whereof, I affix my signature.

WILBER B. MILLER.